United States Patent [19]

Olsson

[11] Patent Number: 5,712,478
[45] Date of Patent: Jan. 27, 1998

[54] APPARATUS FOR MEASURING POSITION OF BALL JOINT

[75] Inventor: Carl Johan Olsson, Åmål, Sweden

[73] Assignee: Swedish Conrtol System AB, Amal, Switzerland

[21] Appl. No.: 634,182

[22] Filed: Apr. 18, 1996

[30] Foreign Application Priority Data

Apr. 20, 1995 [SE] Sweden ............... SE.A.9501442-9

[51] Int. Cl.$^6$ ........................................ G01D 5/34
[52] U.S. Cl. ........................ 250/231.13; 250/231.16; 356/373
[58] Field of Search .................... 250/231.13, 231.16, 250/231.18, 221, 227.22; 73/510, 836, 843; 356/373, 375, 24-25

[56] References Cited

U.S. PATENT DOCUMENTS

| 4,655,544 | 4/1987 | Galvin et al. ............ 250/227.22 |
| 5,057,684 | 10/1991 | Service ................... 250/231.13 |

FOREIGN PATENT DOCUMENTS 3738753 8/1989 Germany.
3830520 3/1990 Germany.
57-154001 9/1982 Japan.

Primary Examiner—Que Le
Attorney, Agent, or Firm—Ostrolenk, Faber, Gerb & Soffen, LLP

[57] ABSTRACT

A sensor for three dimensional detection of the position of a ball joint 1 in which two emitters 14–15 and two collectors 20–21 are located in the ball 4 and socket 5, respectively, of the ball joint 1, and at least one more emitter or collector is located in either the ball 4 or socket 5. Each of the emitters emits a unique signal characteristic and each of the collectors detects and decodes the signals from all emitters. By analyzing the influence of all the emitters on each of the collectors, the position of the ball joint can be deduced. The emitters can be coils or light emitting diodes that emit unique signal frequencies and the collectors can be coils or photo transistors which detects the ratio of signals from each of the emitters. Alternatively, a rotating magnetic field can be induced by three emitter coils in one of the joint halves and detected by three collector coils located in the other joint half.

18 Claims, 5 Drawing Sheets

APPARATUS FOR MEASURING POSITION OF BALL JOINT

The present invention is intended to detect the three dimensional positioning of a bail joint.

BACKGROUND OF THE INVENTION

For the purpose of detecting position of a ball joint, there are several presented ideas. In DE,A,3738753 (IPC G01B 7/30) is shown how a one dimensional sensing device is used for measuring rotation of a ball joint. The unit is shown in an application for measuring door opening angles on buses.

DE,A,3830520 (IPC G05B 1/02) shows a two dimensional version where the rotation around two orthogonal axis are detected by, a light source connected to the bail joint which points at a light sensitive plate which is placed in parallel with, but at a distance from, the orthogonal axis of detection, the plate generates a voltage across opposite sides which gives the position in the direction of measurement. The solution is however not capable of resolving the third possible rotation axis. JP 57-154001, application no 56-38726, (IPC G01B 7/30) shows a solution where it is stated that rotation around all three axis can be resolved. The ball is permanent magnetised, and by arranging three pairs of hall-effect sensors along three orthogonal axis with one sensor on each side of the bail, the position can be extracted from these six measurements. One problem when it comes to applying the idea to ball joints, is that the action radius of the joint will be limited by the physical positioning of sensors. Another problem is that magnetic fields in the vicinity of the sensor will have a large impact on position readout. Yet another problem is that rotation of the bail around its magnetic axis will not change the readout from the sensors at all.

OBJECTS OF THE INVENTION

The main purpose of the invention is to measure the position of a ball joint in three dimensions where the sensor are integrated into the ball and socket of the joint.

Another object for the invention is that the sensor allows for such large action radius around the ball joints three degrees of freedom that the sensor itself will not be the limiting factor.

Yet another object of the invention is to obtain an, in the joint an integrated and protected senor of the solid state type, which results in high reliability, even in harsh environments.

Yet another object of the invention is to obtain a good resolution yet low component count, thus achieving efficient serial production of the sensor, also in extremely small sizes.

SUMMARY OF THE INVENTION

The foregoing and other objects of the invention are achieved in accordance with the present invention by a device which includes at least two signal emitters located at a predetermined distance from each other in the first joint half. At least two signal collectors are located at a predetermined distance from each other in the second joint half. At least one additional signal emitter or signal collector is provided. If an additional signal emitter is provided, it is located at a predetermined distance from the other signal emitters and in the same joint half. If an additional signal collector is provided, collectors and in the same joint half. A signal generating unit is connected to each signal emitter for causing the signal emitters to emit signals having unique characteristics. A signal processing unit is connected to each signal collector for detecting signals from the signal emitters. According to an aspect of the invention, the emitter signal characteristics can be unique with respect to, for example, frequency, wavelength or phase skew.

Utilising the present invention, it is possible to integrate the sensor into remotely controlled micro arms for minimal invasive surgery, where the movable arm parts are connected to each other by ball joints to achieve a maximum number of degrees of freedom in a minimum space. The arm(s) can then be introduced through a minimal opening, for example into the patients abdominal. The arms are preferably driven by actuators under remote control, and the necessary feedback is solved by the sensor, integrated into the joint.

Other features and advantages of the present invention will become apparent from the following description of the invention which refers to the accompanying drawings.

DESCRIPTIONS OF EMBODIMENTS 9 parameter version

Figure 1:
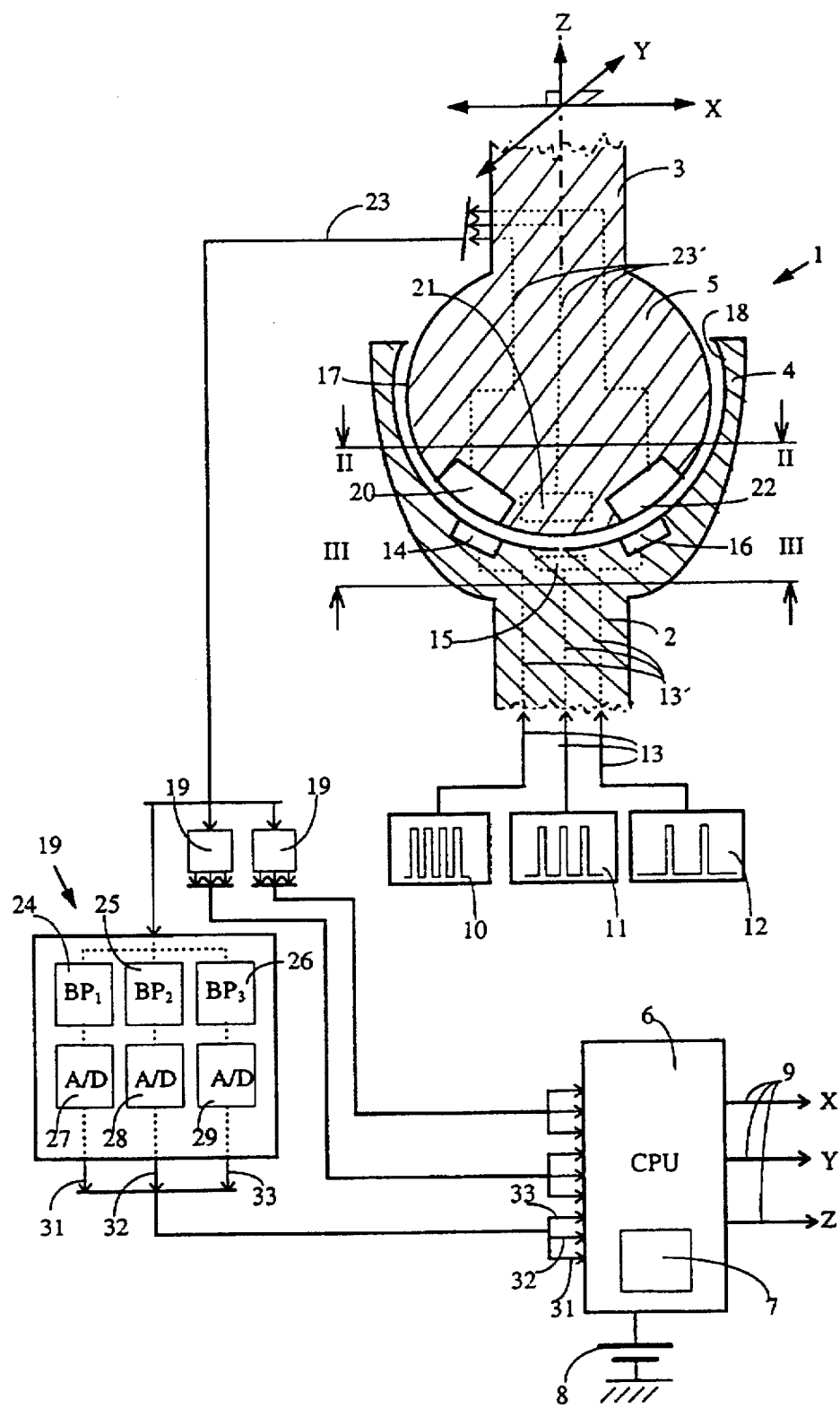
FIG. 1, shows a first form of embodiment of a sensing device for measuring three dimensional rotation of a ball joint according to the invention.

FIG. 1 shows a first form of embodiment of a sensing device for measuring three dimensional rotation of a ball joint according to the invention. The ball joint 1 include: a socket 4 attached to a first arm part which supports the ball 5, attached to a second arm 3. The ball 5 and the herewith connected arm 3 is moveable relative to the socket around three orthogonally oriented axis and thus achieving three degrees of freedom. The axis indicated X, Y and Z are drawn above the ball to improve readability. The intersection is in reality in the balls centre.

Figure 2:
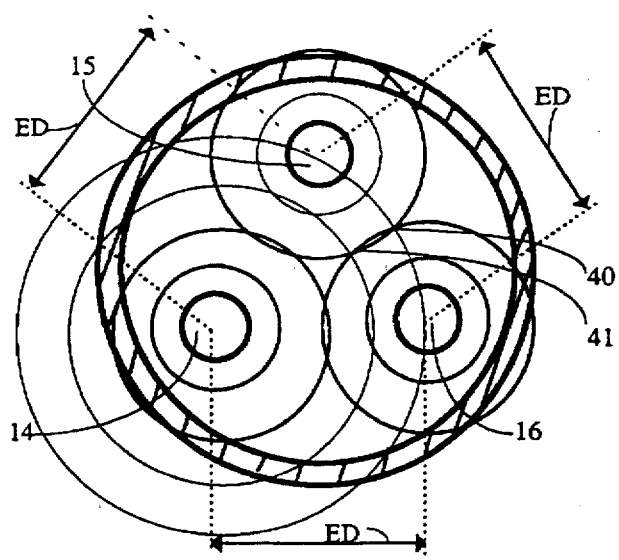
FIG. 2, shows view II—II from FIG. 1, of the socket of the ball joint, with details of the ball removed.
Figure 6:
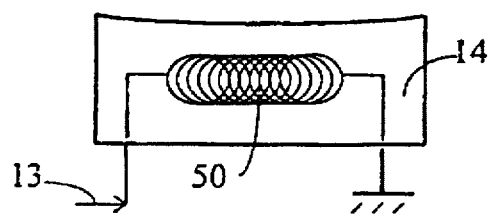
FIG. 6, shows an emitter which is integrated into one of the joint halves, preferably as shown in FIG. 1 in the socket of the ball joint.

The socket has three integrated emitters 14,15 and 16. The emitters are preferably arranged in the socket as in FIG. 2 at a predetermined distance ED from each other, where the active component in the emitter, which emits the characterizing signal, consists of a coil 50, as shown in FIG. 6. Each coil 50, emitters 14,15 and 16 in the socket is driven by its own signal generator 10,11 and 12 through signal wires 13, in which preferably are, as far as possible, moulded into 13' the arm 2. Each signal generator supplies a unique frequency. In FIG. 2, shown with concentric circles, each emitter, emits a signal which decays in strength away from the emitter. In every point of the surface of the socket there will be a unique ratio between signal strengths from the three emitters. For example, in the intersection 40 and 41 the ratio between emitters 15 and 16 are equal, but since the signal from emitter 14 will indicate a larger signal at intersection 41 then 4(3, all points are represented by a unique ratio.

Figure 3:
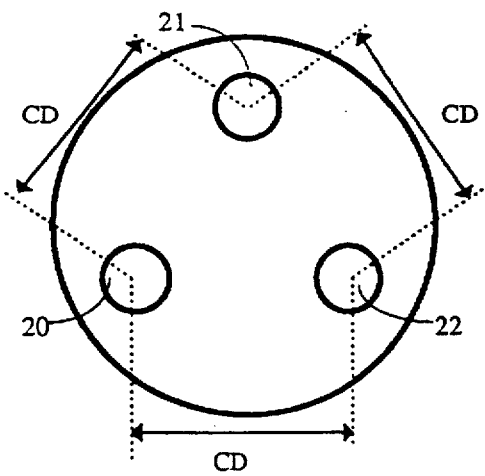
FIG. 3, shows view III—III from FIG. 1, of the ball, with details of the socket removed.
Figure 5:
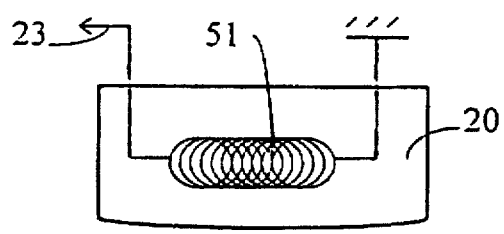
FIG. 5, shows a collector which is integrated into one of the joint halves, preferably as shown in FIG. 1 in the ball of the ball joint.

For the purpose of detecting the position of the ball, at least two collectors have to be integrated into the ball of the ball joint. In FIG. 1, three collectors 20, 21 and 22 are integrated into the ball, positioned close to the ball surface. FIG. 3 shows the view III—III in FIG. 1 where the collectors 20, 21 and 23 in the ball 5 are arranged at a predetermined distance CD from each other in a similar way as the emitters in the socket 4. The active component of the collector, which receives the signal emitted from the emitters is a coil, schematically shown in FIG. 5. The signal picked up by each collector 20-22 is transferred by wires 23 to a signal processing unit 19 for each collector. Only one signal processing unit is shown in more detail in FIG. 1. Every signal processing unit contains three band pass filters 24, 25 and 26 which extracts the signal levels from each of the three emitters. The level of each signal is then submitted to A/D-conversion. The digital representation of the signal level in wire 31 could for example, be the signal level transferred from emitter 14 to collector 20, and wires 32 and 33 could be the signal levels transferred from emitter 15 and 16 respectively to collector 20. The signals from collectors 21 and 22 are processed in the same way by two additional signal processing units. The digital representations 31–33 of signal levels from signal processing unit 19, and the two additional signal processing units gives a total of 9 parameters which are presented to a central processing unit 6 that contains memory 7 and power supply 8. The memory 7 is preferably of a non volatile type which is programmed with the signal ratios from the collectors at a number of ball joint positions.

To determine a ball joint position in three dimensions with this form of embodiment, it requires at least two collectors with each connected to a signal processing unit 19. This results in 6 parameters or two sets of signals 31–33. One collector can be said to detect the angular displacement as shown in FIG. 1, in X and Y direction and the second collector resolves the remaining rotation around the Z-axis.

The form of embodiment shown in FIG. 1 results in 9 parameters. This arrangement has the advantage that the sensor will be able to operate even if one of the collectors goes beyond the range of the emitter, i.e. the action radius will be enlarged.

6 parameter version

Figure 7:
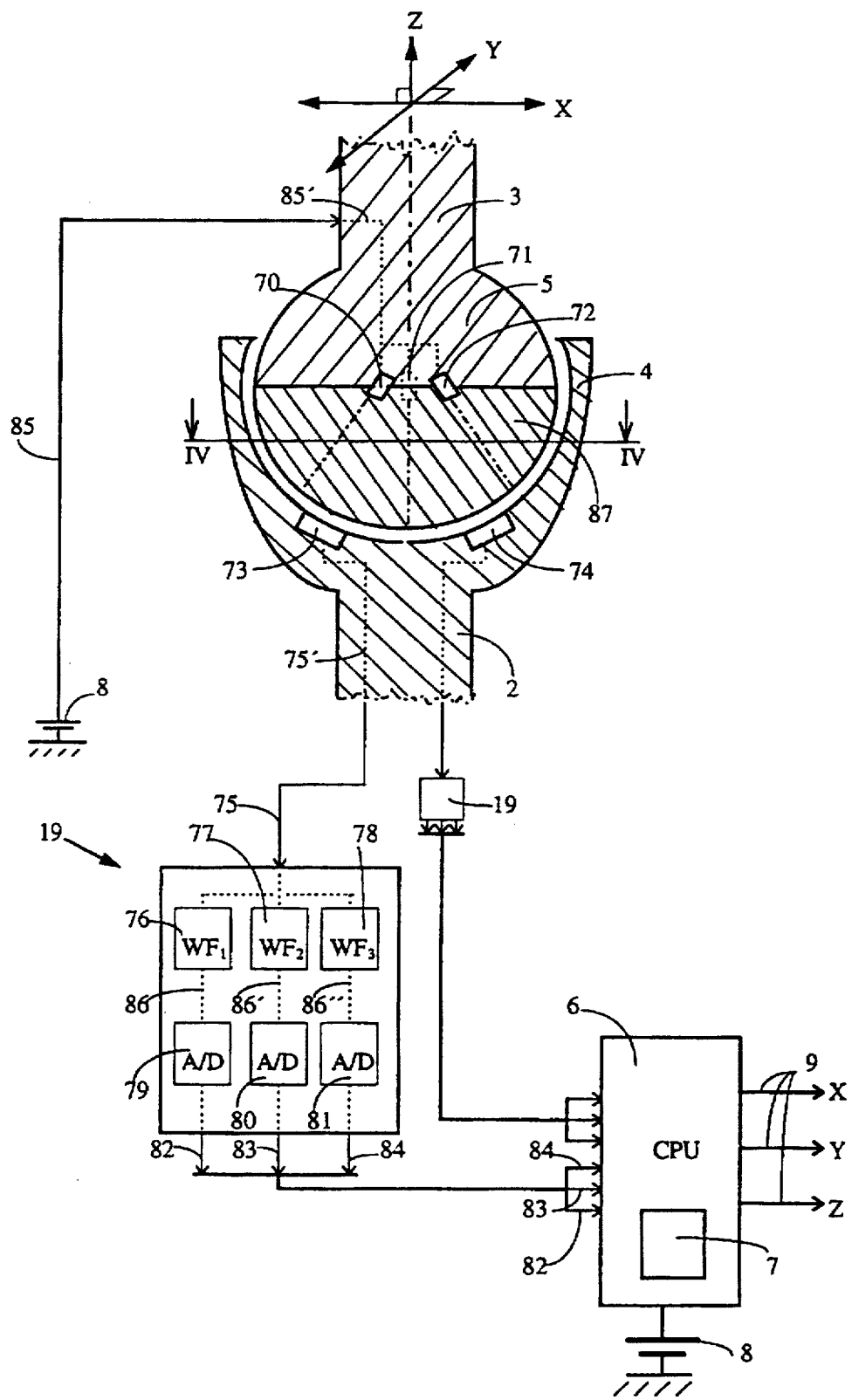
FIG. 7, shows a second form of embodiment of a sensing device for measuring three dimensional rotation of a ball joint according to the invention.

FIG. 7 shows a second form of embodiment of a sensing device for measuring three dimensional rotation of a ball joint according to the invention. The ball joint 1 include: a socket 4, attached to a first arm part, which supports the ball 5, attached to a second arm 3. The ball is, which deviates from the first form of embodiment, equipped with 3 emitters 70,71 and 72 and the socket 4 contain the collectors 73 and 74.

Figure 9:
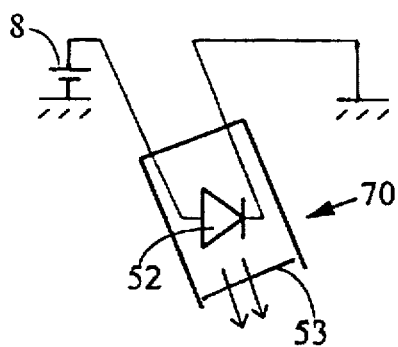
FIG. 9, shows an alternative type of emitter which is integrated into one of the joint halves, preferably as shown in FIG. 7, in the ball of the ball joint.

The emitters 70–72 are light emitting diodes (LED's) 52, as shown in FIG. 9. The LED's are supplied from a common power source through the wire 85 which preferably ID moulded at 85' into the arm 3 and where each LED emits a unique wavelength, for example yellow, red or green light. There is also a possibility of having a common, white source of light with three colour filters are arranged in a similar way to the LED's which also could create the desired smooth colour intensity changes over the ball surface.

The emitters are arranged close to the centre of the ball 5 with a respective light opening 53 at an angle from the Z-axis towards the surface of the ball. Each emitter spreads the light over the surface of the ball in such a way that its respective maximum intensity on the surface will be at a predetermined distance from the other maximum intensity points, similar to the ED distance for the emitters in the first form of embodiment.

The lower half of the ball 87 consists of a transparent material and has preferably an opaque surface. The light intensity from any of the emitters 70–72 on the surface of the lower half of the ball will decay from the point of intensity maximum. Every point of this surface will then have a unique ratio of light intensities.

Figure 4:
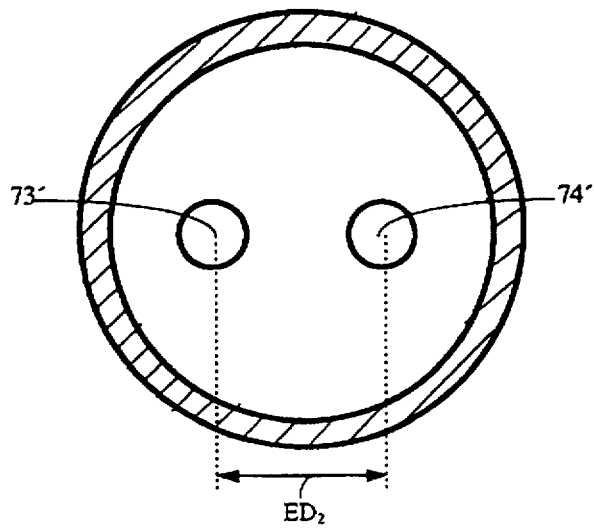
FIG. 4, shows view IV—IV from FIG. 7, of the socket of the ball joint, with details of the ball removed, of an alternative embodiment.
Figure 8:
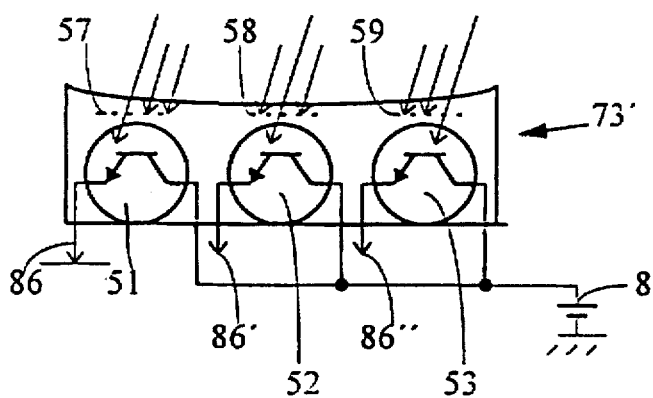
FIG. 8, shows an alternative type of collector which is integrated into one of the joint halves, preferably as shown in FIG. 7, in the socket of the ball joint.

Two collectors 73 and 74 are integrated into the socket of the ball joint. The collectors could in one alternative form of embodiment consist of three photo transistors as shown in FIG. 8, which are each sensitive to the specific wavelengths emitted by the three LED's. The collectors are arranged at a predetermined distance $CD_2$ as shown in FIG. 4.

As shown in FIG. 8, each collector, e.g., the collector 73 includes with photo transistors 54–56 which receive light from the emitters 70–72 through respective openings 57–59 and will deliver output signal D 86,86' and 86" which represents the light intensity from each of the emitter LED's.

The collector can, in another alternative form of embodiment, be implemented with an optic fibre 75 as shown in FIG. 7. The end of the optic fibre is levelled with the surface of the socket 4, the fibre will convey the light intensity information to a remotely placed light sensing device 19 comprised of wavelength filters 76–78 and intensity measuring units 79–81.

The intensity of the filtered output 86 is measured and converted by an A/D converter into digital representation on wire 82 of the light intensity transferred from emitter 70 to collector 73, in the same way as the digital representation on wire 83 and 84 is the light intensity transferred from emitter 71 and 72 to collector 73.

The process of filtering out the desired wavelengths can thus be performed either in the collector as shown in FIG. 8 or in a remotely located signal processing unit 19.

The digital representations 82–84 from the signal processing unit 19 from each of the two collectors gives 6 parameters which are presented to a central processing unit 6 that contains memory 7 and power supply 8. The memory 7 is preferably of a non volatile type which is programmed with the signal ratios from the collectors at a number of ball joint positions.

3 parameter version

Figure 10:
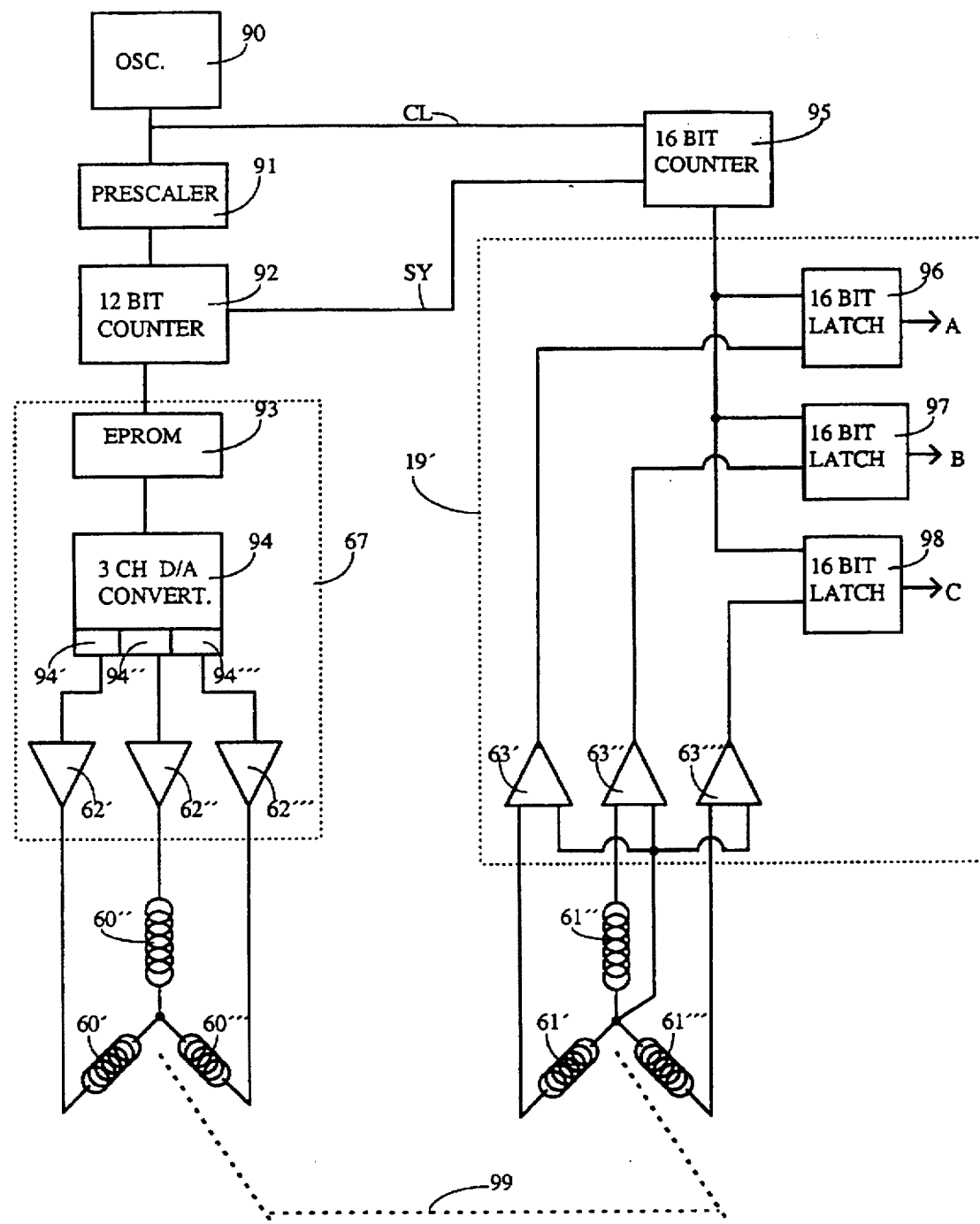
FIG. 10, is a principal schematic of a third form of embodiment of a sensing device for measuring three dimensional rotation of a ball joint according to the invention.

FIG. 10 shows a principal schematic of a circuit solution for a third form of embodiment of a sensing device for measuring three dimensional rotation of a ball joint 1, according to the invention, where the collectors and emitters are coils, integrated in the socket and ball of the ball joint according to FIG. 1. In this third form of embodiment, the three emitter coils 60', 60" and 60'" generates a rotating magnetic field 99 which is picked up by the three collector coils 61', 61" and 61'". The three emitter coils are preferably driven by a three phase 1003 Hz sinusoidal current with a 120° phase skew between the phases. The three coils in each half of the joint are preferably arranged in a orthogonal plane to the axial direction of respective joint arm 2 and 3, and with each coil axis at 120° angle to each other in this plane.

A system clock OSC/90, running at for example, 100 MHz clocks a 16 bit counter 95 and a prescaled 12 bit counter 92, which through an EPROM 93, that contains a sine look-up table, continuously supplies the three A/D converters 94 with data to generate the three phase sine wave forms on outputs 94', 94" and 94'" connected to the amplifiers 62', 62" and 62'" which drives the emitter coils 60', 60" and 60'".

The collector coils 61', 61'" and 61" are connected to respective fast comparators 63', 63" and 63'" for zero cross detection of the collector coil induced current. The outputs of the comparators are connected to respective latches 96,97 and 98 which latch the contents of counter 95. This counter 95 is synchronised with the sine-wave supplied to the emitter coils by means of synchronisation signal SY. The current phase skew of collector coils 61'–61'" can be read from outputs A, B and C by a suitable microprocessor, similar to central processing unit 6 as described in the forms of embodiment shown in FIG. 1 and 7, for further analyses to determine the position of the ball joint. Parts 93,94, 94'–94'" and 62'–62'" forms a signal generating unit that creates the, for each emitter, unique signal, here a phase skew. The signal processing unit 19' that is connected to each collector 61'–61'" comprises parts 63'–63'" and 96–98.

This form of embodiment has the advantage that it does not contain a number of filters and amplifiers with high demands on absolute accuracy. A disadvantage is that there is a chance of having equal or almost equal output information from the collectors at more then one physical position of the ball joint, which has to be handled by the following signal processing. This is particularly so when starting from an unknown position. The physical positions where this can occur is however spaced apart from each other and by positioning the joint in one or more extremes of the action radius at start-up, an intelligent search algorithm can select and track the real position of the joint. The problem can be minimised by optimising size and positioning of coils and action radius.

Calibration of sensor

By connecting the ball joint to a conventional robot that can actuate the ball joint in all three axis, the signal ratio from the collectors can be read, as in the form of embodiment shown in FIG. 1 and 7 or the phase skew as in the form of embodiment shown in FIG. 10. The robot moves the ball joint to for example 100×100×100 (XxYxZ) positions, followed by storing the signal ratio or phase skew for each position in a non volatile memory. The result is an empirically established table that contains the relationship between 1.000.000 positions and 1.000.000 sets of measured sensor data. The central processing units 6 main task is to compare the incoming sensor data with the table data, stored in the memory 7. To maintain a good resolution, a linear interpolation can be made from a number of the closest matches found in the table data.

This method of generating a sensor specific table over signal ratio or phase skew by actually moving the sensor with a robot has the great advantage that physical errors in the sensor system, for example tolerance deviations when positioning emitters and collectors in ball or socket, will be compensated for. The memory must however have a relatively large size, a minimum of 6 Mbytes for a three parameter version with 100×100×100 table positions.

The table search where detected signal ratio or phase skew are matched results in a physical position of the ball joint (X,Y,Z) which are delivered in a suitable way on outputs 9. The indicated position can then be used for feedback information in a three axis servo control loop of the ball joint.

In the forms of embodiment shown in FIG. 1 and 7, it is preferred to store the ratio between signals rather then the absolute signal levels. In the form of embodiment shown in FIG. 7 with LED's that emit for example red, green and blue light, the intensity ratios red/blue, blue/yellow and yellow/red are stored. This compensates for variations in transference efficiency from emitters to collectors.

Other modifications

The invention can be altered in a number of ways within the claims. For example, the emitters can be placed within the socket as in FIG. 1 or in the ball as in FIG. 7, with the collectors on the opposite joint half.

The number of collectors and emitters are always at least two in respective joint halves, where either the number of collectors or emitters are increased with one. This combination of emitters/collectors in quantities ⅔ or ⅔ is sufficient for extracting the data needed to resolve the position when using the methods shown in FIG. 1 or 7. A sensor with two emitters and three collectors has not been shown but could be operated similar to the form of embodiment shown in FIG. 7.

If the phase skew is used as in FIG. 10, the minimum number of emitters and collectors are 3 emitters and 3 collectors.

It is not entirely necessary that the emitters and collectors are placed in a predetermined equal distance from each other, as the positioning is resolved by means of an empirically generated table.

It is however preferable to increase the distance between the emitters and the distance between the collectors as the resolution decreases when this distance decreases.

Wires 23,85 that are moulded into the arm 3 can preferably return on the outside of the ball joint. Exterior wires can be protected by an elastic protective cover. The parts described as socket and ball can be replaced by its counterpart in other joint constructions as for example polhemus joints. The parts described as socket surface and ball surface can be replaced by emitters and collectors placed in equivalent positions in other joint types.

It is not absolutely necessary that the emitters or collectors, when these be coils, are arranged in close proximity to the surfaces of the joint part. The coils can, in these forms of embodiment be displaced towards the centre in the ball or into the body of the socket to obtain maximum signal output for a given displacement of the joint. The coils should be mounted as close as possible to the surface of the ball 5 since this enables the biggest relative movement between collector- and emitter coils. The location of coils in the socket is mainly depending on physical limitations in size of the socket. The coils are preferably located on a sphere with its centre coinciding with the centre of the ball. To minimise the physical dimensions of the complete joint, minimise the demands on signal strength and maximise the resolution, it is preferred that the collectors are located on a first sphere with its centre coinciding with the rotational centre of the joint and that the emitters are located on a second sphere with its centre coinciding with the rotational centre of the joint, and the sphere surfaces coincide with the respective sliding surfaces of the ball joint 4,5.

It is however not necessary that the, in the socket integrated collector- or emitter coils, be arranged on a sphere with its centre coinciding with the rotational centre of the joint. The collector- or emitter coils, integrated into the socket can for example be arranged on a plane that is orthogonal to the arm 2 that is connected to the socket. Although, locating the coils as close to the sliding surface 18 of the socket 4 as possible, will minimise the total physical joint size.

The ball and socket of the joint is preferably made of a non-magnetic material in the forms of embodiment that includes coils, for example a polymer material with all sliding surfaces 17 and 18 of the ball and socket covered with a wear proof film of low friction. The form of embodiment shown in FIG. 7 with LED's in the ball, the lower half of the ball is made of a transparent or opaque material and for example glued to the upper half, made of any material.

It is also possible to integrate a type of transmitter where a nutating magnetic field is used, as described in U.S. Pat. No. 3,983,474 or U.S. Pat. No. 4,017,858 into the ball joint. This type of arrangement allows for three dimensional detection of position between three emitter coils situated in the ball and three collector coils situated in the socket. The coils are arranged orthogonal to each other around the same centre, instead of at a predetermined distance from each other. It is possible that one of the emitter coils can be excluded since U.S. Pat. No. 3,983,474 or U.S. Pat. No. 4,017,858 also detect D the direction vector between the emitter- and collector sets of coils, which here is a constant. The shortcomings of this solution in a ball joint application is for example sensitivity to magnetic disturbances, for example a metallic object in the vicinity of the joint win affect position readout. The forms of embodiment shown in FIG. 1 and 10 which uses cons, will show a higher immunity to disturbances since there is a minimal distance between coils and thereby also minimising the air gap.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. Device for measuring three dimensional movement in a joint about three mutually orthogonal axes, where the joint comprises two joint halves which are moveable in relation to each other around the three orthogonal axis, with a common centre for each joint half, which device comprises:

at least two signal emitters located at a predetermined distance from each other in a first joint half;

at least two signal collectors located at a predetermined distance from each other in a second joint half;

at least one additional signal emitter or signal collector, the additional emitter being located at a predetermined distance from said at least two signal emitters and in the same joint half, the additional signal collector being located at a predetermined distance from said at least two signal collectors and in the same joint half;

a signal generating unit connected to each signal emitter for causing the signal emitters to emit signals having unique characteristics; and a signal processing unit connected to each signal collector for detecting signals from the signal emitters.

2. Device according to claim 1, wherein the signal emitters are sources of light of different wavelengths and each signal collector comprises a number of sensors equal to the number of signal emitters, each sensor detecting light with the wavelength of one of the signal emitters.

3. Device according to claim 2, wherein the signal emitters are light emitting diodes which emits light of different wavelengths, and each of the signal collectors comprises a number of photo transistors equal in number to the number of signal emitters, each photo transistor being sensitive only to the wavelength of one of the signal emitters.

4. Device according to claim 1, wherein the signal emitters are transmitters of signals of unique frequencies and the signal collectors are receivers which receive the transmitted electrical signals from the transmitters.

5. Device according to claim 4, wherein each signal emitter is a coil, the signal generating unit includes a frequency generator connected to each coil for generating an electrical signal therein having a unique frequency, each signal collector is a coil, and the signal processing unit includes a bandpass filter unit connected to each collector coil which filters out from each collector coil respective signals having frequencies equal to the signal emitter frequencies.

6. Device according to claim 1, wherein the signal emitters are coils and the signal generating unit includes a generator that applies a sine wave shaped electrical signal to each signal emitter, the signal applied to each signal emitter having a phase skew in relation to the signal applied to the other signal emitters, the number of signal emitters in the first joint half being at least three and generating a rotating magnetic field and the number of signal collectors in the second joint half being at least three, which signal collectors each detects the phase skew of the rotating magnetic field at the location of each signal collector.

7. Device according to claim 1, wherein the joint is a ball joint having a ball in the first joint half and a socket in the second joint half, the ball and socket moving relative to each over respective sliding surfaces, the signal collectors are located on the surface of a first sphere with its centre coinciding with the centre of the ball joint, and the signal emitters are located on the surface of a second sphere with its centre coinciding with the centre of the ball joint.

8. Device according to claim 3, wherein the joint is a ball joint having a ball in the first joint half and a socket in the second joint half, the ball and socket moving relative to each over respective sliding surfaces, the signal collectors are located on the surface of a first sphere with its centre coinciding with the centre of the ball joint, and the signal emitters are located on the surface of a second sphere with its centre coinciding with the centre of the ball joint.

9. Device according to claim 5, wherein the joint is a ball joint having a ball in the first joint half and a socket in the second joint half, the ball and socket moving relative to each over respective sliding surfaces, the signal collectors are located on the surface of a first sphere with its centre coinciding with the centre of the ball joint, and the signal emitters are located on the surface of a second sphere with its centre coinciding with the centre of the ball joint.

10. Device according to claim 6, wherein the joint is a ball joint having a ball in the first joint half and a socket in the second joint half, the ball and socket moving relative to each over respective sliding surfaces, the signal collectors are located on the surface of a first sphere with its centre coinciding with the centre of the ball joint, and the signal emitters are located on the surface of a second sphere with its centre coinciding with the centre of the ball joint.

11. Device according to claim 7, characterized in that the first and second spheres coincide with the sliding surfaces of the ball joint.

12. Device according to claim 8, characterized in that the first and second spheres coincide with the sliding surfaces of the ball joint.

13. Device according to claim 9, characterized in that the first and second spheres coincide with the sliding surfaces of the ball joint.

14. Device according to claim 10, characterized in that the first and second spheres coincide with the sliding surfaces of the ball joint.

15. Device according to claim 1, further comprising a processor having a memory connected to the signal processing units, the processor making a comparison of the signal processing unit output data to a table in the memory which contains predetermined data on the relationship between signal processing unit output data and physical sensor positions, in order to establish the position of the joint.

16. Device according to claim 12, further comprising a processor having a memory connected to the signal processing units, the processor continuously making a comparison of signal processing unit output data to a table in the memory which contains predetermined data on the relationship between signal processing unit output data and physical sensor positions, in order to establish the position of the joint.

17. Device according to claim 13, further comprising a processor having a memory connected to the signal processing units, the processor making a comparison of signal processing unit output data to a table in the memory which contains predetermined data on the relationship between signal processing unit output data and physical sensor positions, in order to establish the position of the joint.

18. Device according to claim 14, further comprising a processor having a memory connected to the signal processing units, the processor making a comparison of signal processing unit output data to a table in the memory which contains predetermined data on the relationship between signal processing unit output data and physical sensor positions, in order to establish the position of the joint.

* * * * *